US012633700B2

(12) United States Patent
Griepenstroh et al.

(10) Patent No.: US 12,633,700 B2
(45) Date of Patent: May 19, 2026

(54) HIGH-POWER PLUG CONNECTOR

(71) Applicant: HARTING ELECTRIC STIFTUNG & CO. KG, Espelkamp (DE)

(72) Inventors: Sebastian Griepenstroh, Lübbecke (DE); Martin Schmidt, Lübbecke (DE)

(73) Assignee: HARTING ELECTRIC STIFTUING & CO. KG, Espelkamp (DE)

( * ) Notice: Subject to any disclaimer, the term of this patent is extended or adjusted under 35 U.S.C. 154(b) by 552 days.

(21) Appl. No.: 18/040,133

(22) PCT Filed: Jul. 23, 2021

(86) PCT No.: PCT/DE2021/100641
§ 371 (c)(1),
(2) Date: Mar. 1, 2023

(87) PCT Pub. No.: WO2022/022777
PCT Pub. Date: Feb. 3, 2022

(65) Prior Publication Data
US 2023/0327371 A1 Oct. 12, 2023

(30) Foreign Application Priority Data
Jul. 31, 2020 (DE) ..................... 10 2020 120 307.1

(51) Int. Cl.
*H01R 13/53* (2006.01)
*H01R 13/03* (2006.01)
*H01R 103/00* (2006.01)

(52) U.S. Cl.
CPC ........... *H01R 13/53* (2013.01); *H01R 13/035* (2013.01); *H01R 2103/00* (2013.01)

(58) Field of Classification Search
CPC ... H01R 13/53; H01R 13/035; H01R 2103/00
(Continued)

(56) References Cited

U.S. PATENT DOCUMENTS

2005/0094356 A1 5/2005 Onizuka et al.
2012/0018217 A1* 1/2012 Siebens .................. H01R 13/53 174/659
(Continued)

FOREIGN PATENT DOCUMENTS

CN 101527444 A 9/2009
CN 102646887 A 8/2012
(Continued)

OTHER PUBLICATIONS

International Search Report and Written Opinion, mailed Nov. 5, 2021, for International Patent Application No. PCT/DE2021/100641. (10 pages) (with English translation of International Search Report).
(Continued)

*Primary Examiner* — Gary F Paumen
(74) *Attorney, Agent, or Firm* — Seed Intellectual Property Law Group LLP

(57) ABSTRACT

A high-power plug connection system is provided comprising a cable connection housing for connecting at least two electric high-power plug connectors in order to transmit and/or distribute high electric current strengths and/or high electric voltages, at least two insulating bodies for receiving a respective high-power contact and at least one electrically conductive rail, wherein the longitudinal axes of the high-power contacts are arranged essentially in one plane in an offset manner from each other, the high-power contacts being connected together in an electrically conductive manner by the electrically conductive rail, said high-power contacts being provided with at least one recess, into which the rail at least partly fits, and wherein an interior space formed in the cable connection housing is at least partially encapsulated with a dielectric substance.

8 Claims, 2 Drawing Sheets

(58) Field of Classification Search
USPC .................................................. 439/125, 181
See application file for complete search history.

(56) References Cited

U.S. PATENT DOCUMENTS

| | | | | |
|---|---|---|---|---|
| 2012/0329323 | A1* | 12/2012 | Fink | H01R 13/65912 264/104 |
| 2016/0240979 | A1* | 8/2016 | Joo | H01R 13/53 |
| 2017/0012381 | A1* | 1/2017 | Perot | H01R 13/53 |
| 2020/0203896 | A1* | 6/2020 | Wu | G01K 11/265 |

FOREIGN PATENT DOCUMENTS

| | | | |
|---|---|---|---|
| DE | 103 55 790 | A1 | 7/2005 |
| DE | 20 2009 016 081 | U1 | 4/2010 |
| DE | 20 2015 105 428 | U1 | 9/2016 |
| DE | 102017222101 | B3 | 5/2019 |
| WO | 99/59225 | A1 | 11/1999 |
| WO | 2005052702 | A1 | 6/2005 |

OTHER PUBLICATIONS

Office Action, dated Feb. 3, 2021, for German Patent Application No. 10 2020 120 307.1 (7 pages).
International Preliminary Report on Patentability, dated Jan. 31, 2023, for International Patent Application No. PCT/DE2021/100641. (7 pages).

* cited by examiner

HIGH-POWER PLUG CONNECTOR

BACKGROUND

Technical Field

The present disclosure is related to a high-power plug connector system.

Such high-power plug connector systems are needed to transmit and/or distribute high electrical voltages and high electrical currents. Particular attention is paid here to the applicability in underfloor areas of rail-bound vehicles, especially the connection of rail cars and rail carriages to each other.

Description of the Related Art

In the prior art, solutions are known which allow the transmission and/or distribution of high electrical currents and/or voltages between vehicles or between vehicles with attached modules. However, these solutions are partly outdated and require updating/modernizing.

A particular disadvantage of the prior art is an increased spatial requirement. However, for ecological and economic reasons, there is a need for smaller designs of known high-current transmission devices, especially in the field of rail-bound transport.

The German Patent and Trade Mark Office has searched the following prior art in the priority application for the present application: DE 103 55 790 A1, WO 99/59225 A1, DE 20 2015 105 428 U1, DE 20 2009 016 081 U1 and US 2005/0094356 A1.

BRIEF SUMMARY

Embodiments of the invention provide a space-saving, safe and cost-effective cable connection housing, particularly suitable for underfloor use in rail-bound vehicles, for the transmission and/or distribution of high electrical currents.

One embodiment according to the invention of a high-power plug connector system has a cable connection housing for connecting at least two electrical high-power plug connectors in order to transmit and/or distribute high electrical current strengths and/or high electrical voltages, with at least two insulating bodies for receiving at least one high-power contact each and at least one electrically conductive rail, wherein the longitudinal axes of the high-power contacts are arranged basically in one plane and offset from one another, wherein the high-power contacts are electrically conductively connected to one another by the electrically conductive rail, wherein the high-power contacts are provided with at least one recess into which the rail at least partially fits, and wherein an interior space formed in the cable connection housing is at least partially potted with a dielectric substance. The cable connection housing is thus usable at least as a coupling for at least two high-power plug connectors. Advantageously, a cable connection housing according to the invention is formed as a distributor. In particular, the cable connection housing is formed as a Y-distributor. Advantageously, the cable connection housing is formed as a T-distributor. Further advantageously, the cable connection housing is formed as an H-distributor. It is also conceivable that the cable connection housing is formed as an X-distributor. The term “high-power plug connector” means a plug connector which is provided for connection to the cable connection housing. In particular, a high-power plug connector according to the invention is embodied as a single-pole plug connector. Such high-power plug connectors are also referred to as single-pole plug connectors. In particular, the high-power plug connector is designed to transmit a high electrical current strength and/or a high electrical voltage to the cable connection housing. The term “high electrical current strength” means a current strength in excess of 100 amperes. In particular, a current strength of more than 500 amperes is conceivable. Very particularly, a current strength of over 800 amperes is conceivable. A current strength of greater than or equal to 1,000 amperes is also conceivable. The term “high electrical voltage” means a voltage of more than 1 kilovolt. In particular, a voltage of more than 10 kilovolts is conceivable. Very particularly, a voltage of more than 15 kilovolts is conceivable. A current strength of greater than or equal to 25 kilovolts is also conceivable. The term “housing aperture” means an opening in the cable connection housing. This housing aperture leads from an interior space of the cable connection housing into the surrounding exterior space. The exterior space surrounding the cable connection housing is embodied as a connection region at least in the vicinity of the housing apertures. The “connection region” is to be understood as the aforementioned exterior space of the cable connection housing. In accordance with embodiments of the invention, the connection region is formed here in such a way that a high-power plug connector is brought up to an insulating body located in a housing aperture and is connected thereto electrically conductively. By connecting a high-power plug connector to the connection region, a media-tight seal of the interior space is created at the corresponding location in accordance with embodiments of the invention. For this purpose, the housing of the high-power plug connector is shaped in such a way that the housing engages in a basically congruently formed connection region. For improved sealing, both said high-power plug connector and/or the connection region of the cable terminal housing are provided with a seal. The term “dielectric substance” means a substance which can be inserted into the interior space of the cable connection housing so that safety-relevant air gaps and creepage distances do not have to be considered, or can be considered at least to a lesser extent.

For this purpose, one embodiment provides that the dielectric substance substantially surrounds the high-power contacts. Ideally, a substance is used for this purpose which is inserted into the interior space of the cable connection housing in at least a partially liquid or viscous state during assembly and remains in the interior space as an elastic or solid substance in the fully assembled state. The liquid or viscous state allows the dielectric substance to be inserted into the interior space in such a way that the high-power contacts and ideally also the rail are covered or potted or submerged.

A further embodiment provides that the dielectric substance has a high thermal conductivity coefficient. This embodiment ensures in particular that heat generated by high electrical currents and/or voltages is dissipated by the dielectric substance to the cable connection housing. The cable connection housing can dissipate the absorbed heat to its surroundings. On the one hand, the heat can be dissipated to a component to which the cable connection housing is attached. On the other hand, the heat can be dissipated to the ambient air, so that the cable connection housing can ideally be cooled by an airstream, for example when used underfloor in rail-bound vehicles. For this purpose, one embodiment provides that the dielectric substance has a thermal conductivity coefficient of greater than or equal to 1 W/mK.

In a further embodiment, the dielectric substance is produced from at least two components. By way of a substance consisting of two components, both the production process can be accelerated in that a second component allows and/or accelerates the curing of the first substance. Furthermore, two components can advantageously allow the combination of dielectric properties as well as heat-conducting properties due to comparatively high thermal conductivity coefficients.

In this regard, an embodiment provides that the dielectric substance consists at least in part of an epoxy resin. Epoxy resins are typically prepared by mixing two components. After mixing, the epoxy resin is liquid/viscous for a short time and can be poured/injected into the interior space of the cable termination housing. A short curing time is then usually required, after which the epoxy resin solidifies and can no longer be accidentally removed from the cast form.

An alternative embodiment provides that the dielectric substance consists of at least one silicone-containing component. Basically, similarly to epoxy resins, silicone-containing dielectric substances exhibit a certain flexibility after curing, which at least reduces the stress on the components caused by physical tension.

BRIEF DESCRIPTION OF THE SEVERAL VIEWS OF THE DRAWINGS

An exemplary embodiment of the invention is shown in the drawings and is explained in more detail below. In the drawings.

The figures may contain partially simplified, schematic representations. In part, identical reference signs are used for like but possibly non-identical elements. Different views of like elements could be scaled differently. Directional indications such as "left," "right," "top," and "bottom" are to be understood with reference to the figure in question and may vary in the individual representations with respect to the object shown.

DETAILED DESCRIPTION

Figure 1:
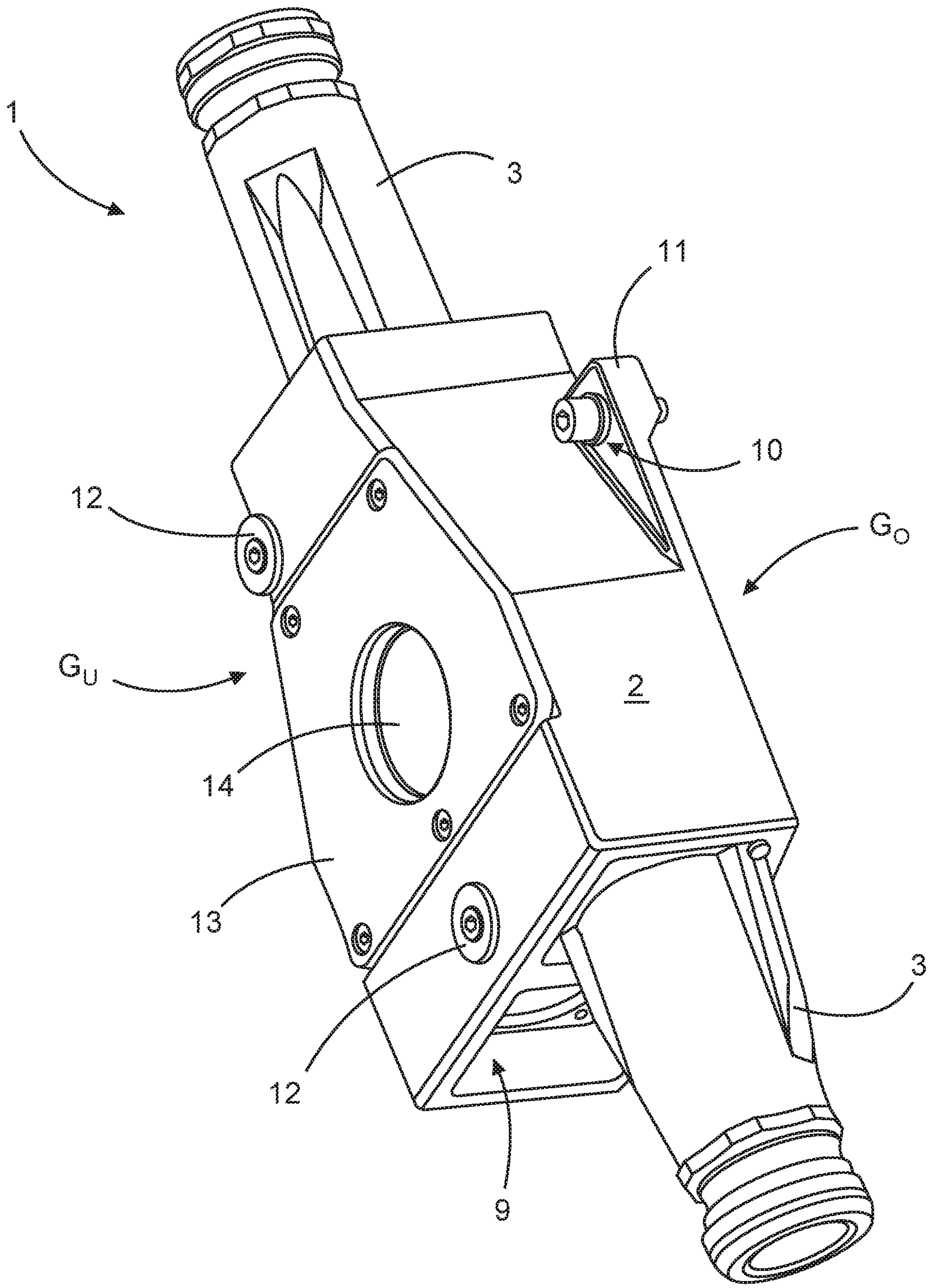
FIG. 1 shows a perspective view of a high-power plug connector system.

FIG. 1 shows a high-power plug connector system 1 according to an embodiment of the invention having a cable connection housing 2 and two high-power plug connectors 3. The cable connection housing 2 is provided with extensions 11, each of which has a recess 10 that allows the cable connection housing 2 to be fastened to a carrier element. Floors of rail-bound vehicles are particularly provided as a carrier element. The cable connection housing 2 further has two contact surfaces 12, which allow the connection of ground cables. Thus, it makes sense to manufacture the cable connection housing 2 from a conductive material. Preferred here is an electrically conductive thermoset. Particularly preferred is a metal material, for example made of a steel, aluminum or a correspondingly useful alloy. For assembly purposes and/or maintenance purposes, the cable connection housing 2 is provided with a housing cover 13. This housing cover 13 has an indentation 14 which can receive, for example, blanking plugs for the connection regions 9, if these blanking plugs are not required.

Figure 2:
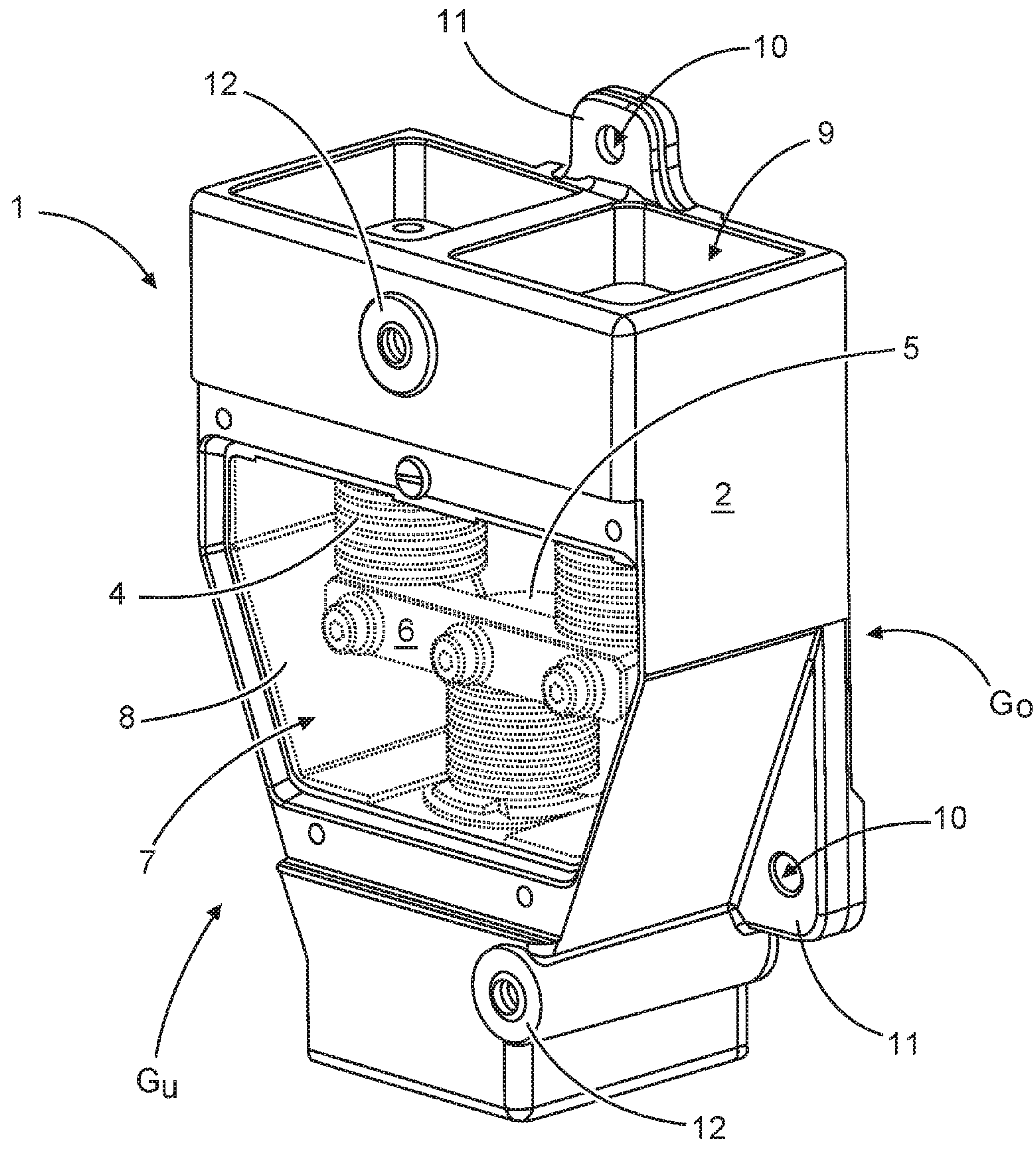
FIG. 2 shows a view into the cable connection housing of a high-power plug connector system.

FIG. 2 provides a view of the interior space 7 of a cable connection housing 2 according to an embodiment of the invention. The housing cover 13 shown in FIG. 1, which is located on the housing bottom side $G_U$, and the high-power plug connectors 3 are not shown. The interior space 7 has three insulating bodies 4 for associated high-power contacts 5. The high-power contacts 5 are mechanically connected to an electrically conductive rail 6. In order to maintain the required clearances and creepage distances in such a compact high-power plug connector system 1, or to circumvent the problem of clearances and creepage distances, the interior space 7 is filled with a dielectric substance 8. In an advantageous way, a gel may be used for this purpose which basically hardens. To simplify a repair process, a silicone-containing dielectric substance 8 is used in accordance with an embodiment of the invention. This can be separated from the interior space 7 to a large extent by simple methods, if desired or necessary. Furthermore, the dielectric substance 8 used in accordance with embodiments of the invention has a thermal conductivity coefficient of greater than or equal to 1 W/mK. Thus, heat accumulation in the interior space 7 is effectively prevented, since the substance 8 can dissipate the heat generated at high current strengths to the cable connection housing 2. The cable connection housing 2 can then dissipate the absorbed heat in the direction of the housing top side Go to the surroundings and/or a supporting component. When the high-power plug connector system 1 is used in the underfloor area of rail-bound transport vehicles, an airstream can additionally be used for cooling.

Even though various aspects or features of the invention are shown in each case in combination in the figures, it is apparent to a person skilled in the art—unless otherwise indicated—that the combinations shown and discussed are not the only possible ones. In particular, corresponding units or feature complexes from different exemplary embodiments may be interchanged with each other. In other words, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A high-power plug connector system, comprising:

a cable connection housing for connecting at least two electrical high-power plug connectors in order to transmit and/or distribute high electrical current strengths and/or high electrical voltages, wherein the cable connection housing is configured to removably receive a first one of the at least two electrical high-power plug connectors in a first plug-in direction and to removably receive a second one of the at least two electrical high-power plug connectors in a second plug-in direction that is opposite of the first plug-in direction;

at least two insulating bodies for receiving at least one high-power contact each, each of the at least two insulating bodies being associated with a respective one of the at least two electrical high-power plug connectors; and at least one electrically conductive rail, wherein a first one of the at least two insulating bodies that is associated with the first one of the at least two electrical high-power plug connectors is located on a first side of the conductive rail, wherein a second one of the at least two insulating bodies that is associated with the second one of the at least two electrical high-power plug connectors is located on a second side of the conductive rail that is opposite the first side of the conductive rail, wherein longitudinal axes of the high-power contacts are arranged basically in one plane and offset from one another, wherein the high-power contacts are electrically conductively connected to one another by the at least one electrically conductive rail, wherein the high-power contacts are provided with at least one recess, into which the at least one electrically conductive rail at least partially fits, and wherein an interior space formed in the cable connection housing is at least partially potted with a dielectric substance.

2. The high-power plug connector system as claimed in claim 1, wherein the dielectric substance substantially surrounds the high-power contacts.

3. The high-power plug connector system as claimed in claim 1, wherein the dielectric substance has a high thermal conductivity coefficient.

4. The high-power plug connector system as claimed in claim 1, wherein the dielectric substance transfers heat generated by the high-power contacts to the cable connection housing.

5. The high-power plug connector system as claimed in claim 1, wherein the dielectric substance has a thermal coefficient of greater than or equal to 1 W/mK.

6. The high-power plug connector system as claimed in claim 1, wherein the dielectric substance is produced from at least two components.

7. The high-power plug connector system as claimed in claim 1, wherein the dielectric substance consists of at least one epoxy resin.

8. The high-power plug connector system as claimed in claim 1, wherein the dielectric substance consists of at least one silicone-containing component.

* * * * *